United States Patent [19]

Eschenburg

[11] Patent Number: 5,268,809
[45] Date of Patent: Dec. 7, 1993

[54] PROTECTION DEVICE FOR A COMPUTER DISKETTE DRIVE

[76] Inventor: John H. Eschenburg, 40 Akkerboom Street, Zwartkops, Verwoerdburg, Transvaal Province, South Africa

[21] Appl. No.: 834,934

[22] Filed: Feb. 13, 1992

[30] Foreign Application Priority Data

Feb. 18, 1991 [ZA] South Africa .................. 91/1190

[51] Int. Cl.⁵ .................. G11B 23/28; G11B 33/00; E05B 73/00
[52] U.S. Cl. .................. 360/137; 360/97.04; 360/99.01; 70/14; 70/58
[58] Field of Search .................. 360/137, 97.04, 99.01; 70/14, 57, 58, 158–164, 169; 369/292

[56] References Cited

U.S. PATENT DOCUMENTS

| | | | |
|---|---|---|---|
| 4,527,405 | 7/1985 | Renick et al. | 70/14 |
| 4,616,490 | 10/1986 | Robbins | 70/14 |
| 4,685,312 | 8/1987 | Lakoski et al. | 70/14 |
| 4,741,185 | 5/1988 | Weinert et al. | 70/57 |
| 4,907,111 | 3/1990 | Derman | 360/97.02 |
| 4,918,952 | 4/1990 | Lakoski et al. | 70/57 |
| 4,918,954 | 4/1990 | Stickel et al. | 70/134 |
| 4,924,683 | 5/1990 | Derman | 70/14 |
| 4,964,285 | 10/1990 | Lakoski et al. | 70/14 |
| 5,022,242 | 6/1991 | Povilaitis | 70/14 |
| 5,124,871 | 6/1992 | Smith | 360/137 |
| 5,136,862 | 8/1992 | Langer | 70/14 |

FOREIGN PATENT DOCUMENTS

| | | | |
|---|---|---|---|
| 0384164 | 8/1990 | European Pat. Off. | 360/137 |
| 3933091 | 4/1991 | Fed. Rep. of Germany | 360/99.01 |
| 8302846 | 8/1983 | PCT Int'l Appl. | |
| 9005340 | 5/1990 | PCT Int'l Appl. | |
| 9005823 | 5/1990 | PCT Int'l Appl. | |
| 2160253 | 12/1985 | United Kingdom | |
| 2168522 | 6/1986 | United Kingdom | |
| 2176232 | 12/1986 | United Kingdom | |
| 2211880 | 7/1989 | United Kingdom | |
| 2240423 | 7/1991 | United Kingdom | |
| 2246901 | 2/1992 | United Kingdom | |

OTHER PUBLICATIONS

"Security Device for A Disk Drive", IBM Technical Disclosure Bulletin, vol. 30, No. 8, Jan. 1988, pp. 178–179.

Primary Examiner—Stuart S. Levy
Assistant Examiner—Craig A. Renner
Attorney, Agent, or Firm—Richards, Medlock & Andrews

[57] ABSTRACT

A protection device for a diskette drive of a computer includes an access prevention member locatable in an access opening of the diskette drive and operable to inhibit insertion of a diskette into the diskette drive. Locking means retains the access prevention member in the access opening of the diskette drive. The locking means includes an arm having at its leading end a transversely extending engagement formation. The arm is rotatably mounted relative to the access prevention member thereby to permit rotation of the arm from an inoperative position while the device is inserted into the access opening of the diskette drive to an operative locking position once inserted into the access opening where the engagement formation engages a drive mechanism of the diskette drive.

7 Claims, 3 Drawing Sheets

PROTECTION DEVICE FOR A COMPUTER DISKETTE DRIVE

This invention relates to a protection device for a computer, particularly, but not necessarily exclusively, a personal computer (PC).

A computer diskette drive, such as a "floppy" diskette drive or a "stiffy" diskette drive, and the like, (hereinafter referred to simply as a diskette drive), normally has an access opening through which a diskette intended for use with that drive can be inserted. The access opening is open to abuse by an unauthorised person as it permits access to software, or copying of software, contained in the computer, permits the introduction of unauthorised software or of a computer virus into the computer, permits access to or copying of confidential data contained in the computer, permits the ingress of dust and foreign objects, and so on. It is an object of this invention to offer a solution to this problem.

According to the invention there is provided a protection device for a diskette drive of a computer, the device including an access prevention member locatable in an access opening of the diskette drive and operable to inhibit insertion of a diskette into the diskette drive, and locking means operable to retain the access prevention member in the access opening of the diskette drive, the locking means including an arm having at its leading end a transversely extending engagement formation and the arm being rotatably mounted relative to the access prevention member thereby to permit rotation of the arm from an inoperative position while the device is inserted into the access opening of the diskette drive to an operative locking position once inserted into the access opening where the engagement formation engages a portion of a drive operating mechanism of the diskette drive.

The access prevention member may be in the form of a panel insertable at least partially into the access opening. In one form, the panel may correspond in size and shape at least partially to the size and shape of the diskette intended for use in the diskette drive. Thus, when the diskette drive is a "floppy" or "stiffy" diskette drive, the panel may have a height and width similar to the respective heights and widths of a "floppy" and "stiffy" diskette. In the case of a "floppy" diskette drive, the panel may have a depth approximately half that of a "floppy" diskette or it may have a recess defined in its leading end so as not to interfere with read and write heads in the diskette drive. In the case of a "stiffy" diskette drive, the panel may have a depth substantially the same as a "stiffy" diskette.

When the access prevention member is in the form of a panel, the arm may be rotatably accommodated in an aperture or channel defined in the panel and extending inwardly from its trailing end. When accommodated in a channel, the arm may be retained therein by a strip of sheet material adhesively secured to the panel and extending across the channel.

The arm may have at its trailing end a flap co-operating with an outwardly extending platform on the panel, the flap having an aperture therein which when the device is in its operative locking position is in alignment with a mating aperture in the platform for receiving a locking device, such as a padlock, a crimped seal, or the like. The platform may have a recess in which the flap is accommodated when the arm is in its operative locking position. An inner edge of the flap may abut against an outer edge of the panel to inhibit axial displacement of the arm along the channel. In the case of a "floppy" diskette drive, the platform may be positioned in the path of a gate operating lever normally used to engage the drive mechanism of the diskette drive so as to prevent operation of the gate operating lever while the device is in its operative position in the diskette drive.

In one embodiment, the arm and the engagement formation may be of a suitable synthetic plastics material. The panel may also be of a synthetic plastics material. In another embodiment, the arm and the engagement formation may be of steel, e.g. a high tensile stainless steel, capable of causing physical damage to the drive operating mechanism if the device is forcibly removed.

The device may further include indicator means for indicating when the arm is in its inoperative and operative positions.

Various embodiments of the invention are now described by way of example with reference to the accompanying drawings, in which FIG. 1 shows a three dimensional view of a protection device in accordance with the invention intended for use with a "floppy" diskette drive;

Figure 1:
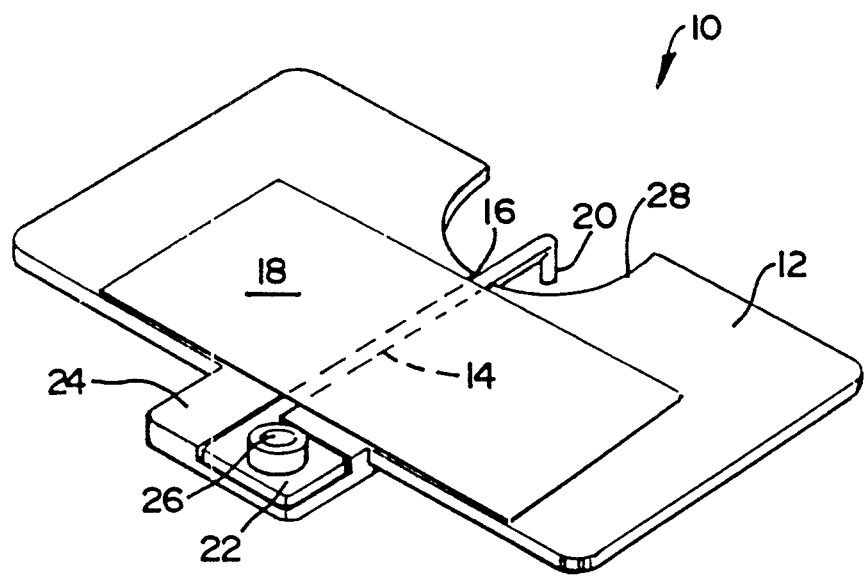
Figure 2:
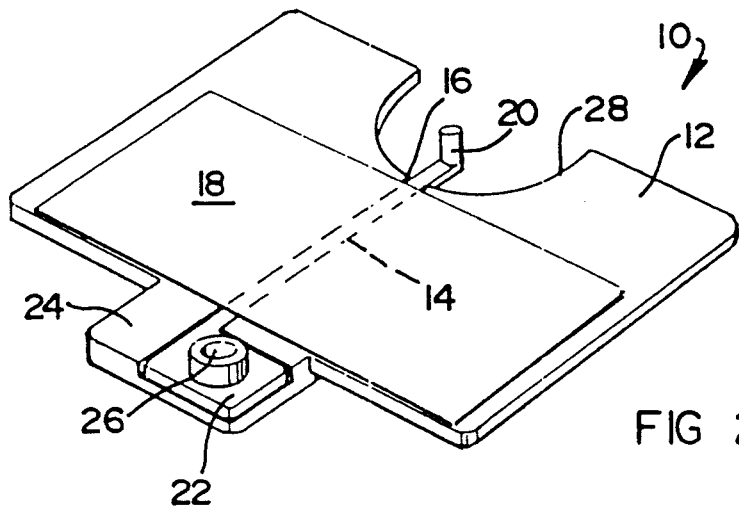
FIG. 2 shows a three dimensional view of a protection device in accordance with the invention intended for use with a "stiffy" diskette drive.
Figure 3:
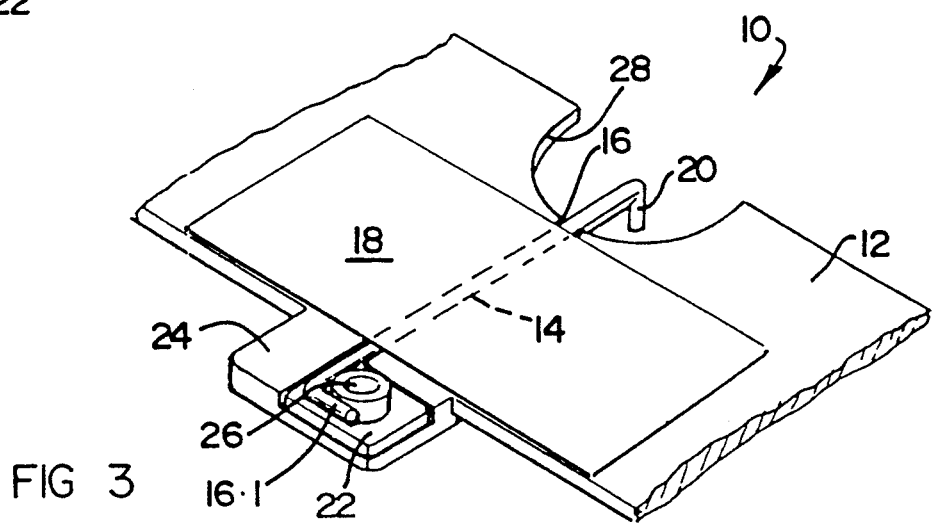
FIG. 3 shows a three dimensional view of a modification of the protection device of FIG. 1.

Referring to FIGS. 1 to 3, reference numeral 10 generally indicates a protection device for a diskette drive and which includes an access prevention member in the form of a panel 12 which is insertable in an access opening of the diskette drive thereby to inhibit the insertion of a diskette into the drive. The device 10 has locking means for retaining the panel 12 in the access opening. In the embodiments illustrated, the locking means includes an arm 14 which is rotatably carried in a channel 16 formed in an upper surface of the panel 12. The arm 14 is retained in the channel 16 by a sheet of material 18 adhesively secured to the upper surface of the panel 12 and extending across the channel 16.

The arm 14 has at its leading end a transversely extending engagement formation 20 which, as will be described in greater detail with reference to FIGS. 4 to 7, engages a portion of a drive operating mechanism of the diskette drive.

The arm 14 has at its trailing end a flap 22 which co-operates with an outwardly extending platform 24 integrally formed with the panel 12. The flap 22 has an aperture 26 which when the arm is in its operative locked position illustrated in FIGS. 1 to 3, is in alignment with a corresponding aperture (not visible in FIGS. 1 to 3) provided in the platform 24. The aperture 26 is intended to receive a simple padlock or any other form of locking device. The flap 22 is also accommodated in a recess provided in the platform 24 so that an inner edge of the flap 22 abuts against an outer edge of the panel 12 while the arm 14 is in its operative locking position as illustrated to inhibit axial displacement of the arm 12 along the channel 16. If desired, the platform 24 may be extended rearwardly and upwardly to provide a support (not shown) in abutting relationship with a rear edge of the flap 22 to prevent outward movement of the arm 14.

In the FIGS. 1 and 3 embodiments, the width and height of the panel 12 corresponds substantially to the width and height of a "floppy" diskette while the depth of the panel 12 is approximately half that of a "floppy" diskette. The height, width and depth of the panel 12 in the FIG. 2 embodiment corresponds substantially to the height, width and depth of a "stiffy" diskette.

The panel 12 has a recess 28 so that the panel does not foul the normal read and write heads of the diskette drives.

In the case of a "floppy" diskette drive, the platform 24 is positioned so as to be in the path of the normal gate operating lever 30 (see FIGS. 4 and 5) and which is used to engage the drive operating mechanism of the disc drive. The platform 24 accordingly prevents the drive operating mechanism from coming into operation.

In FIGS. 1 to 3, the panel 12 is made of a relatively rigid synthetic plastics material. In the FIGS. and 1 and 2 embodiments, the arm 14 is integrally moulded with its engagement formation 20 and flap 22 also from a synthetic plastics material. In the FIG. 3 embodiment, the arm 14 is of a high tensile steel and has a portion 16.1 which is embedded in the flap 22 which may be of a synthetic plastics material. In FIG. 3, the portion 16.1 is shown without being embedded in the flap 22 for ease of illustration.

Figure 4:
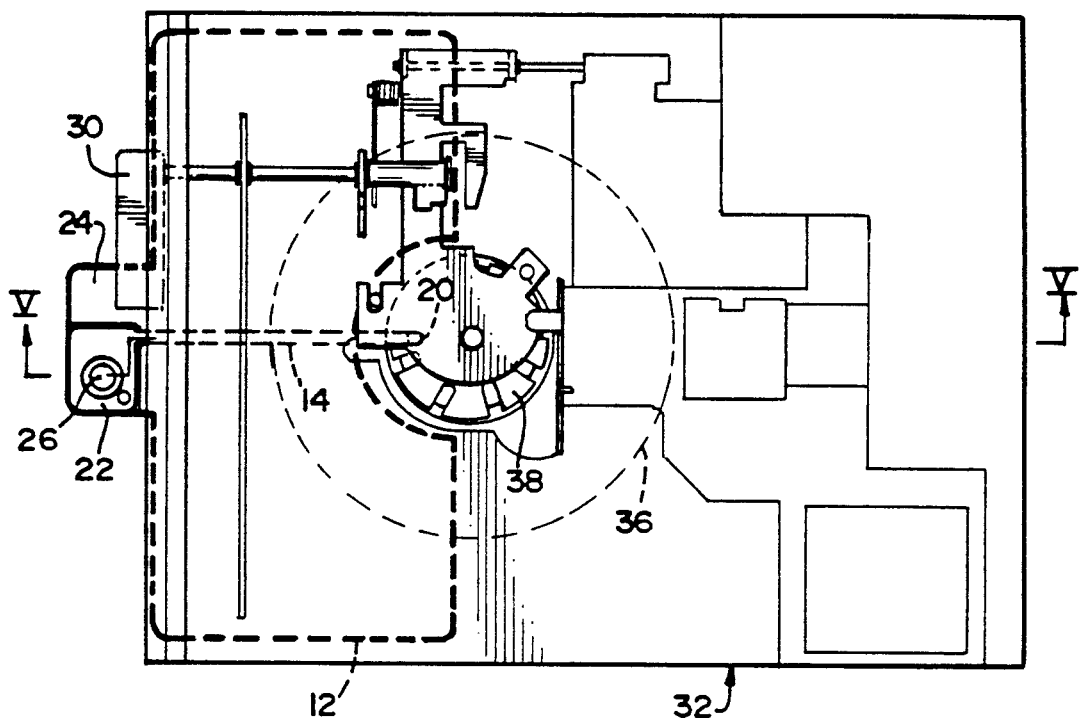
FIG. 4 shows a schematic plan view of the protection device of FIG. 1 in position in a "floppy" diskette drive.
Figure 5:
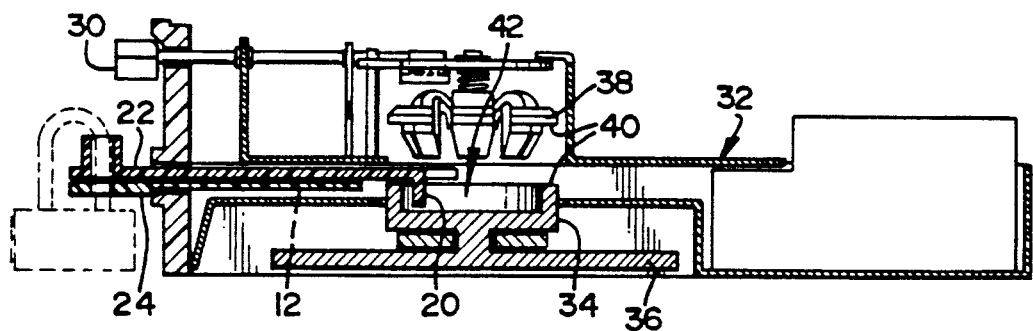
FIG. 5 shows a schematic sectional side view along lines V—V of FIG. 4.

As shown in FIGS. 4 and 5, a "floppy" diskette drive 32 has a drive operating mechanism which includes a drive spindle 34 and a fly wheel 36 driven by a motor (not shown). When a "floppy" diskette is inserted in the drive, and the lever 30 actuated, a segmented drive member 38 is lowered into the central aperture provided in the "floppy" diskette and opposing surfaces 40 clamp the diskette to rotate the diskette.

In order to insert the protection device in the "floppy" diskette drive 32, the arm 14 is rotated through 90° to bring the engagement formation in alignment with the panel 12 in substantially the same plane as the panel 12. The panel 12 is inserted to the position shown in FIGS. 4 and 5 whereafter the arm 14 is rotated back to the position illustrated. It will be seen that the engagement formation 20 engages in the aperture 42 defined in the drive spindle 34. The applicant has found that this is sufficient normally to prevent unauthorised access to the diskette drive. If however a high tensile arm 14 is used as in the FIG. 3 embodiment, and the panel 12 is forcibly removed, the engagement formation 20 will physically damage the drive spindle 34 preventing normal operation of the diskette drive.

Figure 6:
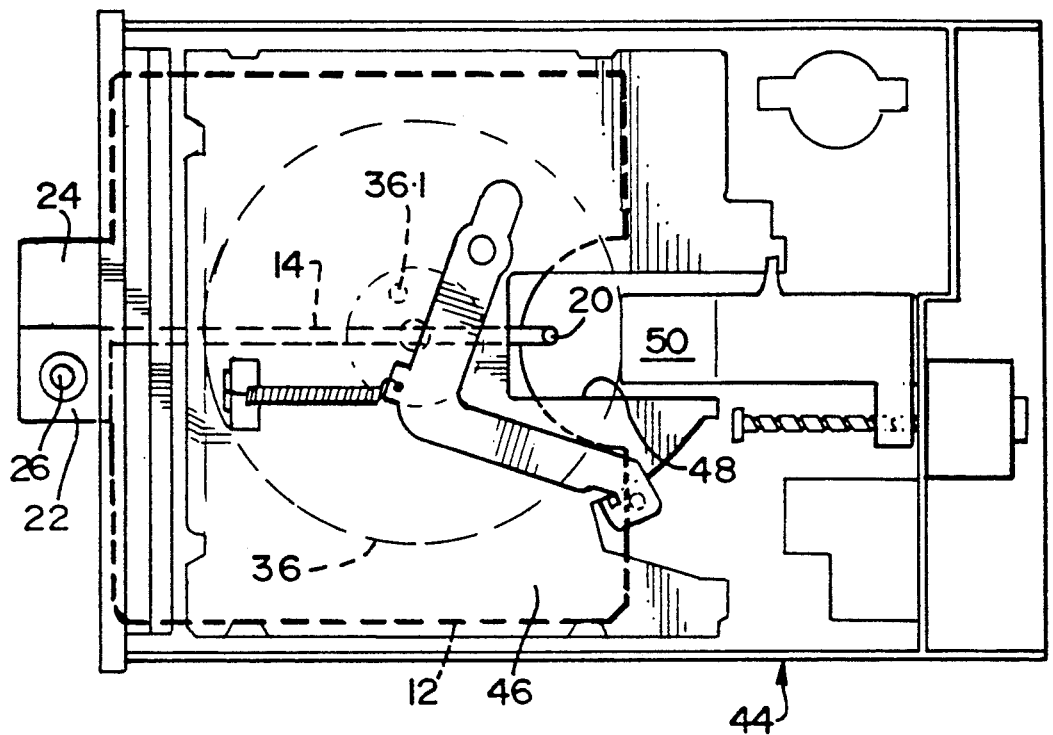
FIG. 6 shows a schematic plan view of the protection device of FIG. 2 in position in a "stiffy" diskette drive and FIG. 7 shows a schematic sectional side view of the drive of FIG. 6.
Figure 7:
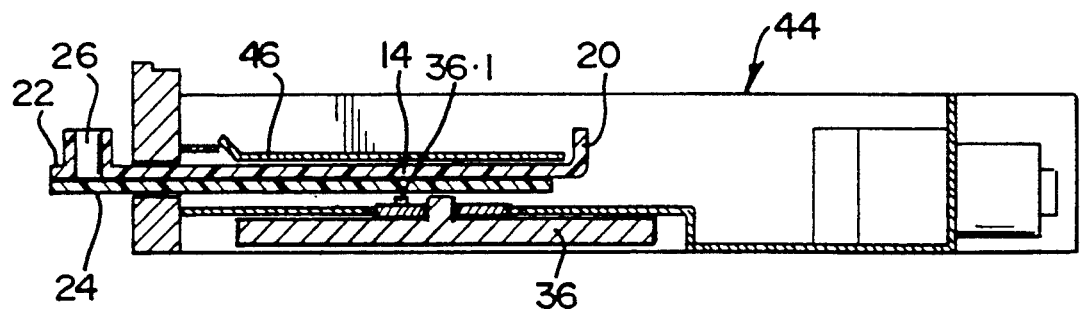

Referring now to FIGS. 6 and 7, a "stiffy" diskette drive 44 is schematically illustrated. This disk drive has a fly wheel 36 driven by a motor (not shown) and a carrier platform 46 which when a "stiffy" diskette is inserted in the drive is lowered to bring the "stiffy" diskette into engagement with a pin 36.1 on the fly wheel 36 to rotate the diskette. The carrier platform 46 has a recess 48 to accommodate the read and write heads 50 (only shown in FIG. 6). The engagement formation 20 it will be noted extends upwardly rather than downwardly and engages in the recess 48 to prevent withdrawal of the panel 12.

The diskette drives illustrated are so called half height drives. The protection device can also be used on older style full height drives in which case a forward end of the arm 14 which projects out of the channel 16 and the formation 20 are made with a somewhat larger diameter than that as illustrated.

The invention illustrated provides a relatively simple, yet it is believed effective, protection device for a PC or other computer making it difficult for an unauthorised person to access the diskette drive when the device is in its operative locked position. Even with the protection device in its operative locked position, the computer can still be used as the protection device does not inhibit booting of the computer from its "hard" disc drive or otherwise affect the normal operation of the computer.

What I claim is:

1. A protection device for a diskette drive of a computer, in which the device includes:
    an access prevention member locatable in an access opening of the diskette drive and operable to inhibit insertion of a diskette into the diskette drive, the access prevention member being in the form of a panel insertable at least partially into the access opening, the panel corresponding in size and shape at least partially to the size and shape of a diskette intended for use in the diskette drive, and
    locking means operable to retain the access prevention member in the access opening of the diskette drive, the locking means including an arm having at its leading end a transversely extending engagement formation and the arm being rotatably mounted relative to the access prevention member thereby to permit rotation of the arm from an inoperative position while the device is inserted into the access opening of the diskette drive to an operative locking position once inserted into the access opening where the engagement formation engages a drive operating mechanism of the diskette drive, the arm having at its trailing end a flap cooperating with an outwardly extending platform on the panel, the flap having an aperture therein which when the device is in its operative locking position is in alignment with a mating aperture in the platform for receiving a locking device.

2. A protection device as claimed in claim 1, in which the platform has a recess for receiving the flap, an inner edge of the flap abutting against an outer edge of the panel to inhibit axial displacement of the arm while the arm is in its operative locking position.

3. A protection device as claimed in claim 1, in which the platform is positioned on the panel to be in the path of a gate operating lever normally used to engage the drive mechanism of the diskette drive so as to prevent operation of the gate operating lever while the device is in its operative position in the diskette drive.

4. A protection device as claimed in claim 1, in which the arm and the engagement formation are of a suitable synthetic plastics material.

5. A protection device as claimed in claim 1, in which the arm and the engagement formation are of steel capable of causing physical damage to the drive operating mechanism if the device is forcibly removed.

6. A protection device as claimed in claim 1, in which the arm is rotatably accommodated in a channel defined in the panel and the arm is retained in the channel by a strip of sheet material adhesively secured to the panel and extending across the channel.

7. A protection device for a diskette drive of a computer, in which the device includes:
an access prevention member locatable in an access opening of the diskette drive and operable to inhibit insertion of a diskette into the diskette drive, the access prevention member being in the form of a panel insertable at least partially into the access opening, the panel corresponding in size and shape at least partially to the size and shape of a diskette intended for use in the diskette drive, and
locking means operable to retain the access prevention member in the access opening of the diskette drive, the locking means including an arm having at its leading end a transversely extending engagement formation and the arm being rotatably mounted relative to the access prevention member thereby to permit rotation of the arm from an inoperative position while the device is inserted into the access opening of the diskette drive to an operative locking position once inserted into the access opening where the engagement formation engages a drive operating mechanism of the diskette drive, the arm being rotatably accommodated in a channel defined in the panel and the arm being retained in the channel by a strip of sheet material adhesively secured to the panel and extending across the channel.

* * * * *